United States Patent
Lee et al.

(10) Patent No.: US 9,136,919 B2
(45) Date of Patent: Sep. 15, 2015

(54) SYSTEM FOR EXTENDING WIRELESS INTERNET COVERAGE

(71) Applicant: KT CORPORATION, Gyeonggi-do (KR)

(72) Inventors: Jung Ho Lee, Seoul (KR); Young Rae Kim, Seoul (KR); Yong Bum Kim, Gyeonggi-do (KR); Hyang Sig Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 348 days.

(21) Appl. No.: 13/708,003

(22) Filed: Dec. 7, 2012

(65) Prior Publication Data

US 2013/0094434 A1   Apr. 18, 2013

Related U.S. Application Data

(63) Continuation of application No. PCT/KR2011/003979, filed on May 31, 2011.

(30) Foreign Application Priority Data

Jun. 7, 2010  (KR) .................. 10-2010-0053336
Aug. 6, 2010  (KR) .................. 10-2010-0076084

(51) Int. Cl.
*H04B 7/02*   (2006.01)
*H04W 16/26*  (2009.01)
(Continued)

(52) U.S. Cl.
CPC ............... *H04B 7/026* (2013.01); *H04W 16/26* (2013.01); *H04W 8/26* (2013.01); *H04W 24/02* (2013.01); *H04W 88/04* (2013.01); *H04W 88/085* (2013.01)

(58) Field of Classification Search
CPC ..................................................... H04W 16/26
See application file for complete search history.

(56) References Cited

U.S. PATENT DOCUMENTS 8,588,351 B2 *  11/2013  Bush et al. .................... 375/347
2005/0206567 A1   9/2005  Torimoto et al.
(Continued)

FOREIGN PATENT DOCUMENTS

CN   101335905 A   12/2008
CN   101473673 A    7/2009
(Continued)

OTHER PUBLICATIONS

Korean Intellectual Property Office, International Search Report for International Application No. PCT/KR2011/003979, Dec. 26, 2011.
(Continued)

*Primary Examiner* — Gary Mui
(74) *Attorney, Agent, or Firm* — IP Legal Services, LLC (57) ABSTRACT

A system for extending coverage of a wireless Internet service by using a mobile communication network is provided. The system includes a wireless access point, a combiner, and a distributor. The combiner is connected to the wireless access point. The combiner includes a filter that isolates a signal band of a wireless Internet signal corresponding to the wireless access point and a signal band of a mobile communication signal corresponding to the mobile communication network. After isolation, the combiner outputs the wireless Internet signal or the mobile communication signal. The distributor is connected to the combiner and at least one antenna. The distributor receives the wireless Internet signal from the combiner and outputs the received wireless Internet signal via the antenna.

11 Claims, 5 Drawing Sheets

(51) Int. Cl.
*H04W 8/26* (2009.01)
*H04W 24/02* (2009.01)
*H04W 88/04* (2009.01)
*H04W 88/08* (2009.01)

(56) References Cited

U.S. PATENT DOCUMENTS

| | | | |
|---|---|---|---|
| 2005/0254442 A1* | 11/2005 | Proctor et al. | 370/294 |
| 2005/0255892 A1* | 11/2005 | Wong et al. | 455/562.1 |
| 2006/0019603 A1* | 1/2006 | Pergal | 455/15 |
| 2007/0082646 A1* | 4/2007 | Behzad et al. | 455/339 |
| 2007/0243899 A1 | 10/2007 | Hermel et al. | |
| 2008/0045152 A1* | 2/2008 | Boes | 455/63.1 |
| 2009/0189806 A1 | 7/2009 | Torimoto et al. | |
| 2010/0118845 A1* | 5/2010 | Solver | 370/338 |
| 2012/0094624 A1* | 4/2012 | Soulhi et al. | 455/226.2 |

FOREIGN PATENT DOCUMENTS

| | | |
|---|---|---|
| JP | 2004-040322 A | 2/2004 |
| JP | 2005-244625 A | 9/2005 |
| KR | 10-1999-0080649 A | 11/1999 |
| KR | 10-2002-0055223 A | 7/2002 |
| KR | 10-2003-0084078 A | 11/2003 |
| KR | 10-2005-0103080 A | 10/2005 |

OTHER PUBLICATIONS

Korean Intellectual Property Office, Written Opinion of the International Searching Authority for International Application No. PCT/KR2011/003979, Dec. 26, 2011.

* cited by examiner

SYSTEM FOR EXTENDING WIRELESS INTERNET COVERAGE

CROSS REFERENCE TO PRIOR APPLICATIONS

This application is a continuation application under 35 U.S.C. §365(c) of International Application No. PCT/KR2011/003979, filed May 31, 2011 designating the United States, which claims priority to Korean Patent Application Nos. 10-2010-0053336 (filed Jun. 7, 2010) and 10-2010-0076084 (filed Aug. 6, 2010), which are all hereby incorporated by reference in their entireties.

TECHNICAL FIELD

The present disclosure relates to extending coverage of a wireless Internet service; and, more particularly, to a system for extending coverage of a wireless Internet service by using a mobile communication network.

BACKGROUND ART

A wide variety of services are being provided to users through smart phones equipped with high-performance CPUs. Accordingly, the smart phone has been very popular. In order to provide the diversified services to the users through the smart phones, a wireless Internet service has been utilized.

For providing the wireless Internet service, a related service provider installs a multiple number of wireless access points (APs) at various places. For example, a great number of wireless APs are installed and operated inside a building.

Because the great number of wireless APs are installed inside the buildings, the quality of the wireless Internet service might be improved. However, it takes a great amount of time and cost to install multiple wireless APs inside the buildings.

Accordingly, there has been a demand for a method for extending the coverage of the wireless APs with reduced cost and time by using existing facilities

DISCLOSURE OF THE INVENTION

Problems to be Solved by the Invention

In order to address the above-described conventional problems, exemplary embodiments provide a system capable of extending the service coverage of a wireless access point by using existing facility associated with a communication network.

However, the object of the present disclosure is not limited to the above description and various other objects can be clearly understood by those skilled in the art from the following description.

Means for Solving the Problems

According to one aspect of an exemplary embodiment, a system for extending coverage of a wireless Internet service by using a mobile communication network is provided. The system may include a wireless access point, a combiner, and a distributor. The combiner is connected to the wireless access point. The combiner includes a filter that isolates a signal band of a wireless Internet signal corresponding to the wireless access point and a signal band of a mobile communication signal corresponding to the mobile communication network. After the isolation, the combiner outputs the wireless Internet signal or the mobile communication signal. The distributor is connected to the combiner and at least one antenna. The distributor receives the wireless Internet signal from the combiner and output the received wireless Internet signal via the antenna.

According to another aspect of the exemplary embodiment, a system for extending coverage of a wireless Internet by using a mobile communication network is provided. The system may include a distributor, a combiner, and a wireless access point. The distributor is connected to at least one antenna and receives a mobile communication signal or a wireless Internet signal via the antenna. The combiner receives the mobile communication signal or the wireless Internet signal from the distributor. The combiner includes a filter that isolates a signal band of the mobile communication signal and a signal band of the wireless Internet signal and outputs the mobile communication signal or the wireless Internet signal. The wireless access point is connected to the combiner. The wireless access point receives the wireless Internet signal outputted from the combiner and transmits the received wireless Internet signal.

The above and other objects and features will become apparent from the following description of exemplary embodiments given in conjunction with the accompanying drawings.

However, it should be noted that the present disclosure is not limited to the exemplary embodiments to be described below and the exemplary embodiments are provided for the purpose of illustration so that the scope of the present disclosure is clearly understood by those skill in the art.

Effect of the Invention

In accordance with an exemplary embodiment, the time and cost for installing wireless access points can be saved by using an existing facility.

BEST MODE FOR CARRYING OUT THE INVENTION

Hereinafter, embodiments in accordance with the present disclosure will be described in detail by reference to the accompanying drawings so that the present disclosure may be readily understood by those skilled in the art.

However, it is to be noted that the present disclosure is not limited to the embodiments but can be realized in various other ways.

In the drawings, parts not relevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Further, the term "comprises or includes" and/or "comprising or including" used in the document means that one or more other components, steps, operation and/or existence or addition of elements are not excluded in addition to the described components, steps, operation and/or elements.

Hereinafter, exemplary embodiments in accordance with the present disclosure will be explained in detail by reference to the accompanying drawings.

Figure 1:
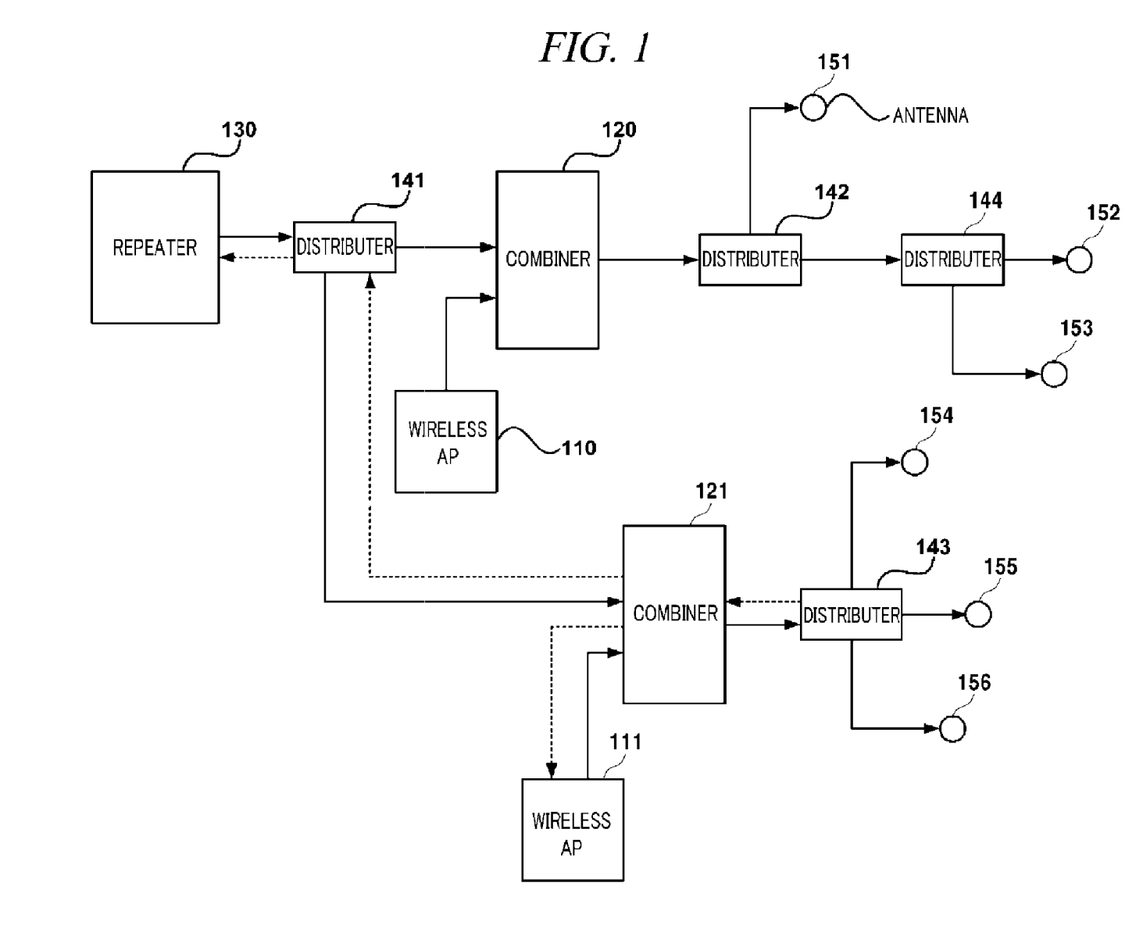
FIG. 1 is a diagram illustrating a configuration of a system for extending coverage of a wireless Internet service by using a mobile communication network in accordance with an exemplary embodiment.

FIG. 1 is a diagram illustrating a system for extending coverage of a wireless Internet service by using a mobile communication network in accordance with an exemplary embodiment.

The system for extending coverage of a wireless Internet service in accordance with the exemplary embodiment may include at least one of wireless access points (AP) 110 and 111, at least one of combiners 120 and 121, a repeater 130, and at least one of distributors 141, 142, 143, and 144.

Each of these constituent components will now be explained. The wireless AP 110 is connected with the combiner 120. Such wireless AP 110 may be configured to transmit or receive wireless internal signals through the combiner 120.

The wireless AP 110 allows a mobile communication device that has accessed the wireless AP 110 to use an Internet network. For example, the wireless AP 110 may allow a mobile communication device to send or receive calls to/from another device through the Internet network.

Further, the wireless AP 110 may enable a mobile communication device to receive data, for example data packets, provided from a certain web server (not shown).

For this purpose, the wireless AP 110 may receive a request for DHCP (Dynamic Host Configuration Protocol) communication from a mobile communication device in order to set up a new IP address.

When receiving the request, the AP 110 may receive identification information from the mobile communication device. The identification information may include a MAC address, an international mobile equipment identity (IMEI), an international Mobile Subscriber Identity (IMIS), and a mobile identification number (MIN).

In order to allocate a new IP address of the mobile communication device, the wireless AP 110 may generate a DHCP message. The DHCP message may include an IP address of the wireless AP 110 and the identification information of the mobile communication device. The wireless AP 110 may transmit the created DHCP message to a DHCP server (not shown). The wireless AP 110 may receive the new IP address allocated to the mobile communication device from the DHCP server. The wireless AP 110 may be a Wi-Fi type wireless AP. In the following description of the exemplary embodiment, the AP wireless AP 110 is described as a Wi-Fi type wireless AP.

For reference, the mobile communication device may include a fixed mobile convergence device. Within a wireless Internet service area of wireless AP 110, the mobile communication device may access the wireless AP 110 and provide a wireless Internet service and an Internet phone call (VoIP) service to a user.

Outside the wireless Internet service area of the wireless AP 110, the mobile communication device may provide a wireless data communication service and a phone call service to a user using a mobile communication network. The mobile communication device may include a handheld wireless communication device that supports a w-code division multiple access (WCDMA) and a wireless broadband Internet (Wibro) as well as a Wi-Fi type.

The combiner 120 may be connected to an output end of the wireless AP 110. The combiner 120 may be configured to receive a wireless Internet signal from the wireless AP 110. The combiner 120 may also be connected to an output end of a first distributer 141 connected with the repeater 130. In this case, the combiner 120 may receive a signal of the mobile communication network from the first distributer 141. Alternatively, the combiner 120 may be directly connected to an output end of the repeater 130. In this case, the combiner 120 may receive a signal of the mobile communication network directly from the repeater 130.

Further, the combiner 120 is connected to an input end of a second distributer 142. Accordingly, the combiner 120 may transmit a wireless Internet signal or a signal of the mobile communication network to the second distributer 142. A combiner 121 may be connected to an output end of a third distributer 143 coupled to an antenna 151. In this case, the combiner 121 may receive a signal of the mobile communication network or a wireless Internet signal from the distributer 143.

The combiner 121 may transmit the signal of the mobile communication network to the repeater 130 through the first distributer 141 and the wireless Internet signal to a wireless AP 111, respectively. For example, the combiners 120 and 121 may receive the wireless Internet signal or the signal of the mobile communication network and isolate a signal band of the wireless Internet signal and a signal band of the mobile communication network.

For the isolation, the combiners 120 and 121 may include various filters for filtering the signal band of the wireless Internet signal and the signal band of the mobile communication network.

The filter may include at least one of a band pass filter (BPF), a low pass filter (LPF) and a high pass filter (HPF).

To be more specific, the combiner 120 may include a band pass filter that only passes a signal band of a predetermined frequency.

By way of non-limiting example, a mobile communication network signal may be transmitted using a frequency band ranging from about 1.8 GHz to about 2.1 GHz and a wireless Internet signal may be transmitted using a frequency band of about 2.4 GHz. In this case, the combiner 120 may include a band pass filter of about 1.8 GHz to about 2.1 GHz and a band pass filter of about 2.4 GHz. Accordingly, the combiner 120 may pass only a mobile communication network signal in the frequency band of 1.8 GHz to about 2.1 GHz and a wireless internal signal in the frequency band of about 2.4 GHz.

In addition to the band pass filter, the combiner 120 may further include a low pass filter that allows passage of a signal band not greater than a predetermined frequency.

Referring back to the above example, the combiner 120 may pass the mobile communication network signal equal to or lower than about 2.1 GHz using a low pass filter that pass a frequency band equal to or lower than about 2.1 GHz. Particularly, the combiner 12 may pass the mobile communication network signal equal to or lower than about 1.8 GHz to about 2.1 GHz. Furthermore, the combiner 120 may pass the wireless Internet signal of about 2.4 GHz using a band pass filter of about 2.4 GHz.

Since the low pass filter only passes a frequency band equal to or lower than about 2.1 GHz, a mobile communication network signal using a frequency band of about 900 MHz may also be passed through the low pass filter.

In addition to the band pass filter, the combiner 120 may further include a high pass filter that passes a frequency band equal to or higher than a predetermine frequency.

As described, the combiner 120 may include the band pass filter that only passes a frequency band in the range of about 1.8 GHz to about 2.1 GHz and a high pass filter that only passes a frequency band equal to or higher than about 2.4 GHz. With these filters, the combiner 120 may pass a mobile communication network signal in the frequency band of about 1.8 GHz to about 2.1 GHz and a wireless Internet signal in the frequency band of about 2.4 GHz.

Furthermore, the combiner 120 may include the low pass filter and the high frequency filter.

Referring back to the aforementioned example, the combiner 120 may include the low pass filter that passes a frequency band equal to or lower than about 2.1 GHz and the high pass filter that passes only a frequency band equal to or higher than about 2.4 GHz. With these filters, the combiner 120 may only allow passage of a mobile communication network signal in the frequency band equal to or lower than about 2.1 GHz and passage of a wireless Internet signal in the frequency band equal to or higher than about 2.4 GHz.

That is, the combiner 120 may include two band pass filters. Alternatively, the combiner 120 may include one band pass filter and one of low the pass filter and the high pass filter. Still alternatively, the combiner 120 may include one low pass filter and one high pass filter.

In addition, the combiner 120 may reduce interference between a wireless Internet signal and a mobile communication network signal by isolating them using the filters.

The isolation of the signals for reducing the interference therebetween may depend on an output level of the mobile communication network signal at a location where the combiner 120 is inserted. That is, the isolation may depend on a signal band of the wireless Internet signal and an output of the repeater 130 that transmits the mobile communication network signal.

By way of non-limiting example, when an output level of the repeater 130 is about 10 dBm and when the repeater 130 isolates a wireless Internet signal of a frequency band of about 2.4 GHz, a WCDMA signal of a frequency band of about 2.1 GHz, and a CDMA signal of a frequency band of about 1.8 GHz, the combiner 120 may transmit the respective signals while reducing the interference between the wireless Internet signal and the mobile communication network signals.

For reference, as the level of isolation of these signals increases, the interference between the Internet signal and the mobile communication network signals can be more effectively reduced. However, as the level of isolation becomes higher, the size and the cost of the combiner 120 may also be increased. On the contrary, if the level of isolation is too low, the interference between the wireless Internet signal and the mobile communication network signals may not be effectively reduced, thus causing an adverse effect on a phone call quality.

In accordance with an exemplary embodiment, the level of isolation capable of reducing the interference between the wireless Internet signal and the mobile communication network signals may be equal to or higher than about 30 dB. Desirably, the isolation level may be equal to or higher than about 80 dB.

Meanwhile, the repeater 130 may be configured to amplify a mobile communication network signal and allow the amplified mobile communication network signal to be outputted through at least one distributer and antennas connected to the at least one distributer.

In this case, the mobile communication network signal transmitted to the at least one of the distributers 142 and 144 from the repeater 130 may be outputted through antennas 151, 152, and 153 connected with the distributers 142 and 144 after filtering by the band pass filter or the low pass filter (LPF) in the combiner 120 connected to the output end of the distributer 141.

Meanwhile, the distributer 142 may be connected to at least one antenna 151 and output a wireless Internet signal or a mobile communication network signal through the antenna 151.

Further, the distributer 142 may variously transmit the wireless Internet signal or the mobile communication network signal received through the antenna 151 to the combiner 120.

For the purpose, the distributer 141 may be connected to the output end of the repeater 130 and input ends of multiple combiners (e.g., combiners 120 and 121), and transmit the mobile communication network signal amplified by the repeater 130 to the respective combiners 120 and 121.

Further, the distributer 142 may be connected to output end of the respective combiner 120. With this configuration, the distributer 142 may output the mobile communication signal or the wireless Internet signal filtered by the combiner 120 through the at least one antennas 151 or transmit the signal to other distributer 144.

Furthermore, the distributer 143 may be connected to an input end of the respective combiner 121 and transmit the wireless Internet signal received through at least one of antennas 154 to 156 to the combiner 121.

Moreover, the distributer 143 may be configured to transmit the mobile communication network signal received through at least one of the antennas 154 to 156 to the repeater 130 or to the distributer 141 connected with the repeater 130.

As stated above, the wireless Internet signal of the wireless AP 110 is transmitted through the existing facilities in the mobile communication network in accordance with an exemplary embodiment. That is, the wireless Internet signals of the wireless AP 110 may be transmitted through the distributer 141 connected to the repeater 130 and the antennas 151 to 156 connected variously to the distributers 142 to 144. Accordingly, the wireless Internet service coverage of the wireless AP 110 can be enlarged to the mobile communication service coverage of the mobile communication network with comparatively low cost.

By way of non-limiting example, four wireless access points are generally required in order to provide a wireless Internet service to two basement levels of a building in accordance with a typical method. Unlike the typical method, the same wireless Internet service may be provided to two basement levels by adding one combiner 120 and one wireless AP 110 connected with the combiner 120 to the existing facilities of the mobile communication network in accordance with an exemplary embodiment. That is, the combiner 120 and the wireless AP 110 may be installed with the existing facilities such as a repeater, a distributer connected to the repeater and multiple antennas connected to at least one distributer in accordance with at least one embodiment. With this configuration, the same wireless internet service may be provided in two basement levels with almost the same effect as obtained by the typical method using the four wireless APs.

Figure 2:
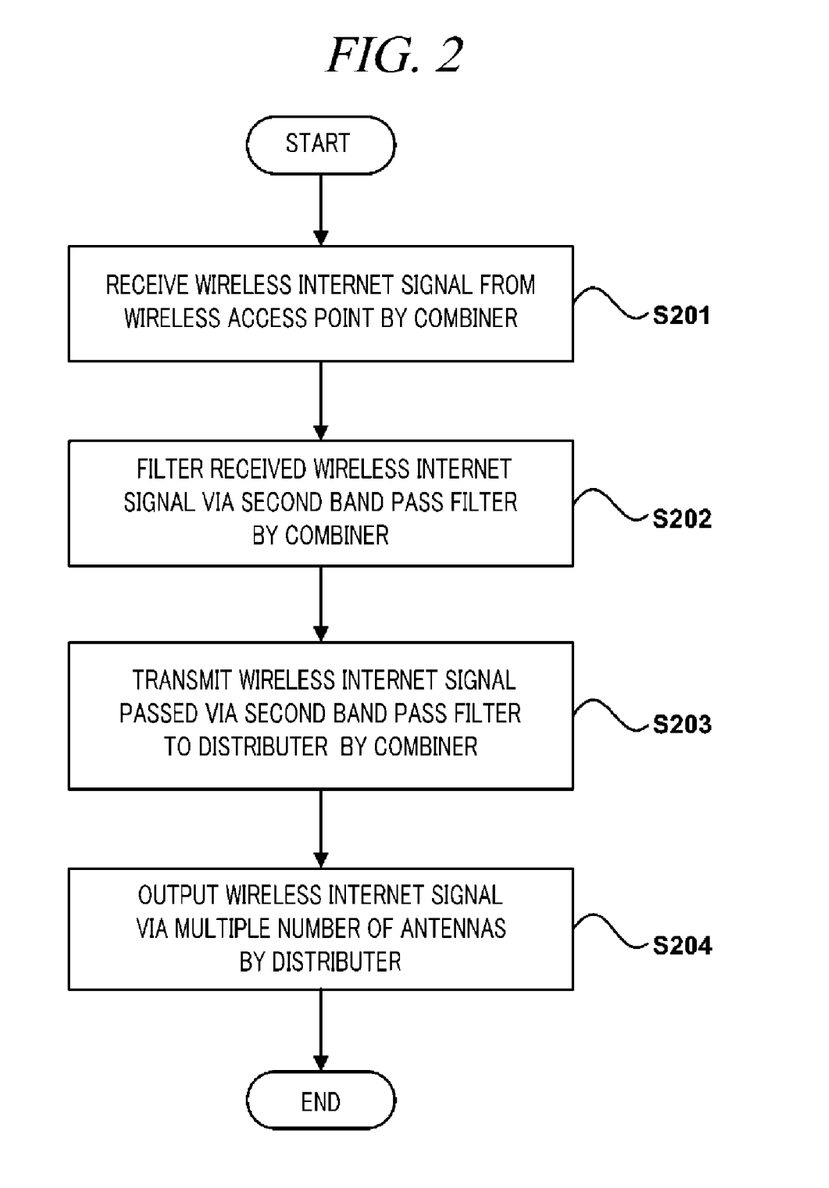
FIG. 2 is a flowchart for describing a process for extending coverage of a wireless Internet service by using a mobile communication network in accordance with an exemplary embodiment.

FIG. 2 is a flowchart for describing a process for extending coverage of a wireless Internet service by using a mobile communication network in accordance with the illustrative embodiment.

The flowchart shown in FIG. 2 will be described based on the constituent components of the system illustrated in FIG. 1.

For reference, the mobile communication device may access the wireless AP 110 and make a request for DHCP communication for setting a new IP address in order use wireless Internet.

Further, the wireless AP 110 may receive identification information such as a MAC address, IMEI, IMSI or MIN.

Thereafter, in order to allocate the new IP address of the mobile communication device, the wireless AP 110 may generate a DHCP message including its own IP address and the aforementioned identification information of the mobile communication device. Then, the wireless AP 110 may transmit the generated message to a DHCP server (not shown).

Afterward, the wireless AP 110 may receive the new IP address allocated to the mobile communication device from a DHCP server (not shown). Accordingly, a mobile communication device including a FMC device may be allowed to use wireless Internet through the wireless AP 110.

Further, the combiner 120 may include a first band pass filter and a second band pass filter. The first band pass filter may only pass a mobile communication network signal in a frequency band of about 1.8 GHz to about 2.1 GHz. The second band pass filter may only pass a wireless Internet signal in a frequency band of about 2.4 GHz.

The level of isolation of the first band pass filter and the second band pass filter may be equal to or higher than about 30 dB. Desirably, the level of isolation may be equal to or higher than about 80 dB.

At step S201, the combiner 120 receives a wireless Internet signal from the wireless AP 110.

At step S202, the combiner 120 passes only the wireless Internet signal received in the step S201 through the second band pass filter.

In the step S202, signals not in 2.4 GHz band (e.g. a mobile communication network signal) cannot be passed through the combiner 120 due to the presence of the second band pass filter.

Further, since the level of isolation of the first band pass filter and the second band pass filter may be equal to or higher than about 30 dB, and, desirably, equal to or higher than about 80 dB, interference between the wireless Internet signal and the mobile communication network signals may be effectively reduced.

After the step S202, the combiner 120 may pass the wireless Internet signal of the AP 110 through the second band pass filter.

At step S203, the combiner 120 transmits the wireless Internet signal of the wireless AP 110 having passed through the combiner 120 to the distributer 140.

At step S204, the distributer 140 outputs the wireless Internet signal of the wireless AP 110, which is received from the combiner 120, through multiple antennas.

Figure 3:
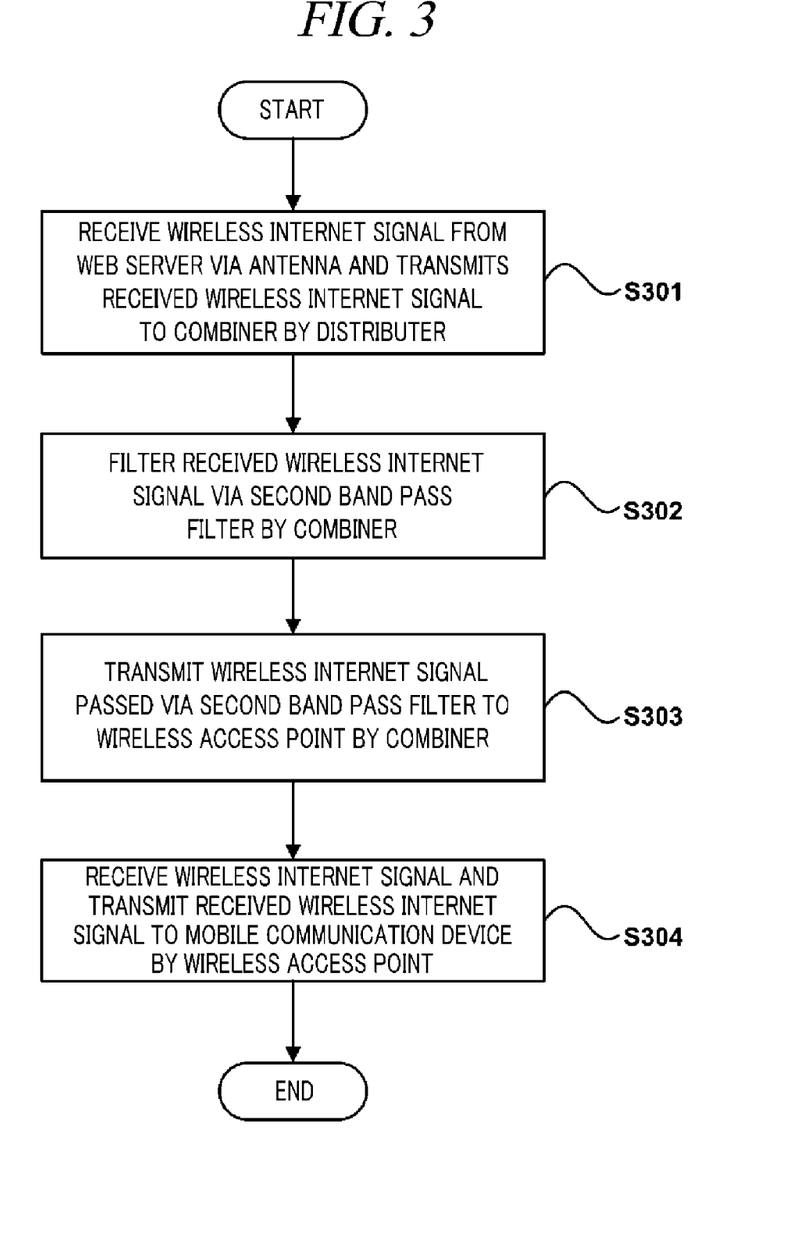
FIG. 3 is a flowchart for describing a process for extending coverage of a wireless Internet service by using a mobile communication network in accordance with another exemplary embodiment.

FIG. 3 is a flowchart for describing a process for extending coverage of a wireless Internet by using a mobile communication network in accordance with another exemplary embodiment.

Hereinafter, the flowchart of FIG. 3 will be described based on the constituent components of the system illustrated in FIG. 1.

For reference, the flowchart of FIG. 3 describes a case where a mobile communication device receives data from a certain web server (not shown) through the wireless AP 110 of the system shown in FIG. 1.

In accordance with an exemplary embodiment, the combiner 120 includes a first band pass filter that only passes a mobile communication network signal in a frequency band of, e.g., about 1.8 GHz to about 2.1 GHz and a second band pass filter that only passes a wireless Internet signal in a frequency band of, e.g., about 2.4 GHz.

At step S301, the distributer 140 receives a wireless Internet signal (data packet) from a web server (not shown) through an antenna and transmits the received wireless Internet signal to the combiner 120.

At step S302, the combiner 120 filters the received wireless Internet signal through the second band pass filter.

In the step S302, signals of not in about 2.4 GHz band (e.g., mobile communication network signals) cannot be passed through the combiner 120 due to the presence of the second band pass filter.

Further, the level of isolation of the first band pass filter and the second band pass filter may be equal to or higher than, e.g., about 30 dB, and, desirably, equal to or higher than, e.g., about 80 dB. Accordingly, interference between the wireless Internet signal and the mobile communication network signals can be effectively reduced.

At step S303, the combiner 120 passes the wireless Internet signal through the second band pass filter.

At step S303, the combiner 120 transmits the wireless Internet signal, which has passed through the second band pass filter, to the wireless AP 110.

At step S304, the wireless AP 110 transmits the wireless Internet signal received in step S303 to a mobile communication device.

Figure 4:
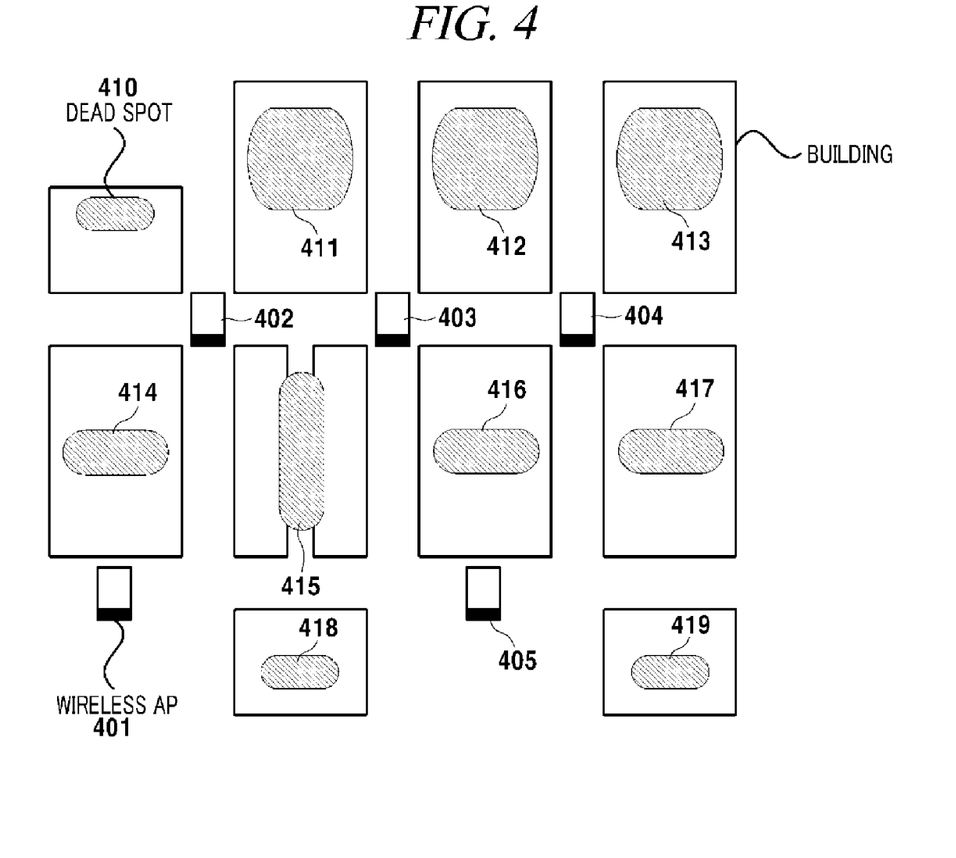
FIGS. 4 and 5 are diagrams illustrating a conventional method for providing a wireless Internet service and an inventive method for providing a wireless Internet service in accordance with an exemplary embodiment, respectively.
Figure 5:
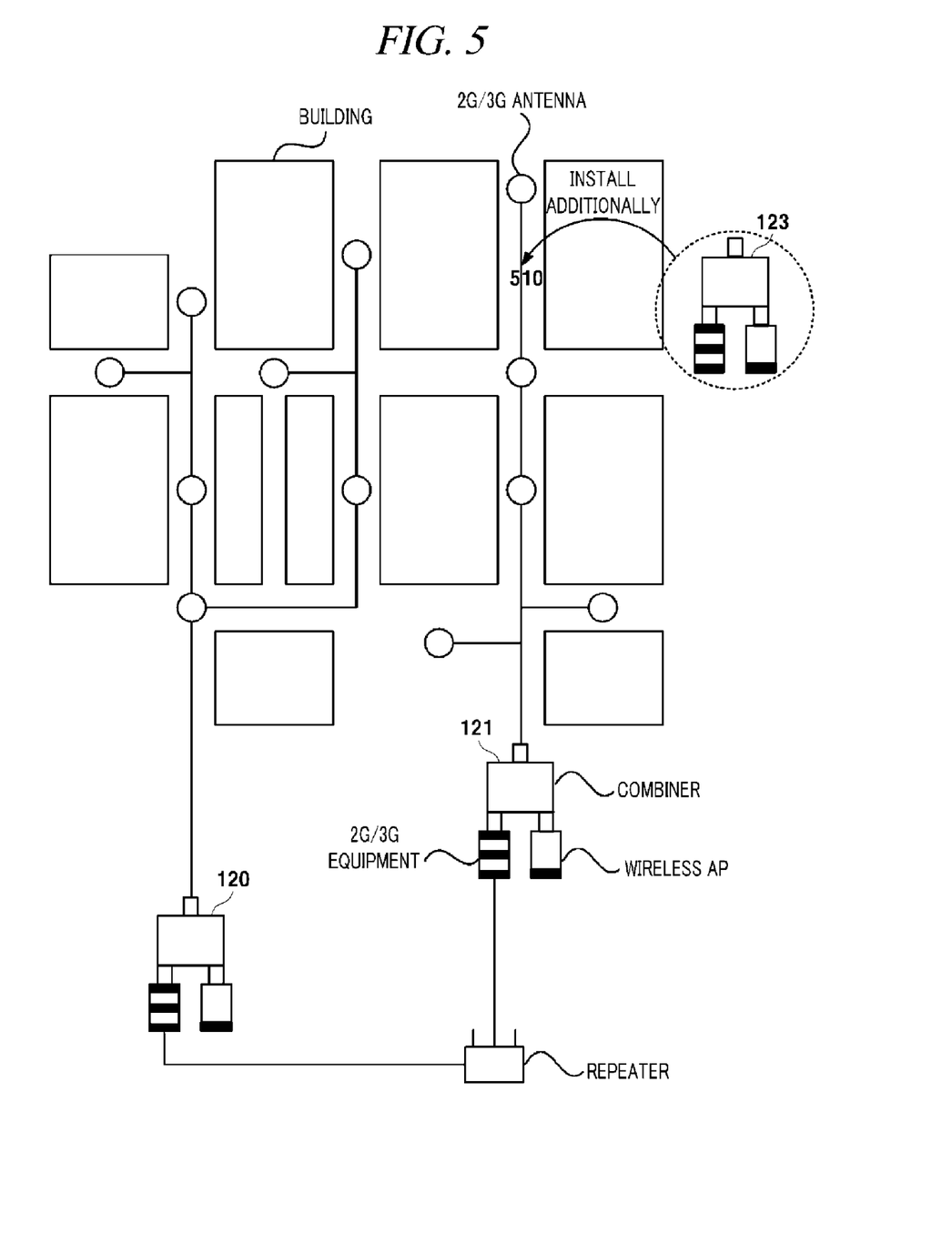

FIGS. 4 and 5 are diagrams for the comparison of a typical method for providing a wireless Internet service and an inventive method for providing a wireless Internet service using the mobile communication network in accordance with an exemplary embodiment.

In the typical method, the wireless Internet service is provided by installing multiple wireless APs 401 to 405 at certain positions of each building in addition to a 2G/3G mobile communication network.

As shown in FIG. 4, five wireless APs 401 to 405 are installed in accordance with the typical method. Buildings, however, still have dead spots 410 to 419. The dead spot may denote an area where the wireless Internet service is not provided. In order to remove such a dead spot, additional wireless APs are required to be installed, resulting in a cost rise.

As shown in FIG. 5, at least one of combiners 120 to 123 may be installed with existing facilities of the mobile communication network in order to extend the wireless Internet service coverage of a wireless AP in accordance with an exemplary embodiment The wireless internet signal may be transmitted via the existing facility of the mobile communication network through the at least one of combiners 120 to 123 in accordance with an exemplary embodiment.

Accordingly, it is possible to eliminate the dead spot problem that has occurred in the typical method. For example, a wireless Internet signal is weak at a region 510 because an output power of a wireless AP is weak. Such problem might be easily solved by inserting or installing additional combiner 123 operating in accordance with the exemplary embodiment at the 2G/3G mobile communication network of the region 510.

The above description of the present disclosure is provided for the purpose of illustration, and it would be understood by those skilled in the art that various changes and modifications may be made without changing technical conception and essential features of the present disclosure.

Thus, it is clear that the above-described embodiments are illustrative in all aspects and do not limit the present disclosure.

For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

What is claimed is:

1. A system for extending coverage of a wireless Internet service by using a mobile communication network, the system comprising:
    a wireless access point configured to provide the wireless internet service to devices within a predetermined service area of the wireless access point;
    a combiner coupled to the wireless access point and configured to provide the wireless internet service to devices outside the predetermined service area of the wireless access point using the mobile communication network; and
    a distributor of the mobile communication network for providing a mobile communication service to devices, coupled to the combiner, and coupled to at least one antenna of the mobile communication network,
    wherein the combiner is configured to
        receive at least one of a wireless Internet signal for the wireless Internet service from the wireless access point and a mobile communication signal for the mobile communication service from the mobile communication network,
        isolate, with a filter, a signal band of the wireless Internet signal corresponding to the wireless access point and a signal band of the mobile communication signal corresponding to the mobile communication network, and
        output at least one of the wireless Internet signal and the mobile communication signal from the filter to the distributor of the mobile communication network, and
    wherein the distributor of the mobile communication network is configured to
        receive the wireless Internet signal for the wireless Internet service from the combiner and
        output the received wireless Internet signal via the at least one antenna of the mobile communication network.

2. A system for extending coverage of a wireless Internet service by using a mobile communication network, the system comprising:
    a distributor of the mobile communication network for providing a mobile communication service, and coupled to at least one antenna of the mobile communication network;
    a combiner configured to provide the wireless Internet service using the distributor and the at least one antenna of the mobile communication network; and
    a wireless access point coupled to the combiner and configured to provide the wireless Internet service,
    wherein the distributor of the mobile communication network is configured to receive at least one of a mobile communication signal and a wireless Internet signal via the at least one antenna,
    wherein the combiner is configured to
        receive the at least one of the mobile communication signal and the wireless Internet signal from the distributor of the mobile communication network;
        isolate, by a filter, isolates a signal band of the mobile communication signal and a signal band of the wireless Internet signal; and
        output the at least one of the mobile communication signal and the wireless Internet signal from the filter and output the wireless Internet signal to the wireless access point, and
    wherein the wireless access point is configured to
        receive the wireless Internet signal from the combiner; and
        transmit the received wireless Internet signal.

3. The system of claim 2, wherein the filter of the combiner comprises:
    a first band pass filter configured to filter the signal band of the wireless Internet signal; and
    a second band pass filter configured to filter the signal band of the mobile communication signal.

4. The system of claim 2, wherein the filter of the combiner comprises:
    a band pass filter configured to filter the signal band of the wireless Internet signal; and
    a low pass filter configured to filter the signal band of the mobile communication signal.

5. The system of claim 2, wherein the filter of the combiner comprises:
    a high pass filter configured to filter the signal band of the wireless Internet signal; and
    a low pass filter configured to filter the signal band of the mobile communication signal.

6. The system of claim 2, wherein the filter isolates a signal band of a wireless Internet signal and a signal band of a mobile communication signal based on the signal band of a wireless Internet signal and output level of the distributor, and wherein an isolation level of the filter is equal to or higher than 30 dB.

7. The system of claim 2, wherein installation positions of the combiner and the wireless access point are based on an output level of the wireless access point.

8. A combiner of receiving a signal from a wireless access point and a mobile communication network device and transmitting the received signal to a distributer, the combiner comprising:
    a wireless Internet receiving unit configured to receive a wireless Internet signal for a wireless Internet service from the wireless access point connected to the wireless Internet receiving unit;
    a mobile communication signal receiving unit configured to receive a mobile communication signal for a mobile communication service from the mobile communication network device connected to the mobile communication signal receiving unit;
    a filter configured to isolate a signal band of the wireless Internet signal and a signal band of the mobile communication signal; and
    a filter signal output unit configured to transmit at least one of the wireless Internet signal and the mobile communication signal from the filter to the distributer of the mobile communication network.

9. The combiner of claim 8, wherein the filter comprises:
a first band pass filter configured to filter the signal band of the wireless Internet signal; and
a second band pass filter configured to filter the signal band of the mobile communication signal.

10. The combiner of claim 8, wherein the filter comprises:
a band pass filter configured to filter the signal band of the wireless Internet signal; and
a low pass filter configured to filter the signal band of the mobile communication signal.

11. The combiner of claim 8, wherein the filter comprises:
a high pass filter configured to filter the signal band of the wireless Internet signal; and
a low pass filter configured to filter the signal band of the mobile communication signal.

\* \* \* \* \*